United States Patent [19]

Bischoff

[11] Patent Number: 5,603,856
[45] Date of Patent: Feb. 18, 1997

[54] ELECTRICALLY HEATED WINDSHIELD WIPER WITH ENCLOSING FLEXIBLE SHROUD

[75] Inventor: George Bischoff, Harrisburg, N.C.

[73] Assignee: Lon Baker, Marble, Pa.

[21] Appl. No.: 334,681

[22] Filed: Nov. 4, 1994

[51] Int. Cl.$^6$ ................ B60S 1/04; H05B 3/02
[52] U.S. Cl. .................. 219/202; 219/203; 15/250.05
[58] Field of Search .................... 219/203, 202, 219/544; 15/250.05, 250.42

[56] References Cited

U.S. PATENT DOCUMENTS

| | | | |
|---|---|---|---|
| 2,656,448 | 10/1953 | Lentz | 219/203 |
| 2,727,271 | 12/1955 | Oishei et al. | 15/250.42 |
| 2,728,100 | 12/1955 | Oishei | 15/250.42 |
| 2,746,077 | 5/1956 | Higgins | 15/250.05 |
| 3,074,096 | 1/1963 | Van Hess | 219/203 |
| 3,408,678 | 11/1968 | Linker | 15/250.05 |
| 3,523,626 | 8/1970 | Racine et al. | 15/250.42 |
| 3,574,881 | 4/1971 | Temple | 219/203 |
| 3,619,556 | 11/1971 | Deibel et al. | 219/203 |
| 3,667,083 | 6/1972 | Linker | 15/250.42 |
| 3,852,570 | 12/1974 | Tyler | 219/528 |
| 4,325,160 | 4/1982 | Burgess | 15/250.06 |
| 4,360,941 | 11/1982 | Mabie | 15/250.42 |
| 4,670,933 | 6/1987 | Toplenszky | 15/250.07 |
| 4,683,606 | 8/1987 | Sharp | 15/250.42 |
| 5,325,561 | 7/1994 | Kotlar | 15/250.06 |
| 5,412,177 | 5/1995 | Clark | 219/203 |

*Primary Examiner*—John A. Jeffery
*Attorney, Agent, or Firm*—Clifford A. Poff

[57] ABSTRACT

A windshield wiper is provided with an electrical heater that extends along a face of secondary pressure frames used to carry a squeegee and forms a flexible support on a primary pressure frame. A shroud is wrapped about a primary pressure frame and is formed with a reversely bent portion to allow a bead portion of the squeegee to form its usual mounting function using a metal strip that can slide into grooves separating the bead portion from the flexible wiping edge. The shroud encloses an electrically heated chamber to prevent ice and snow deposits on the shroud.

6 Claims, 2 Drawing Sheets

ELECTRICALLY HEATED WINDSHIELD WIPER WITH ENCLOSING FLEXIBLE SHROUD

BACKGROUND OF THE INVENTION

1. Field of the Invention

This invention relates to an electrically heated windshield wiper, and, more particularly to a such a wiper in which the electrical heater is supported by secondary pressure frames and enveloped by a shroud for preventing the accumulation of ice, sleet and snow on the shroud as well as the squeegee element of the windshield wiper.

2. Description of the Prior Art

The operation of a windshield wiper on curved windshields particularly windshields with complex curvatures is impaired when there accumulates in an environment characterized by such adverse circumstances as subfreezing or even sub-zero temperatures, ice, sleet, and snow. The impairment to the operation is attributed according to the underlying principal of the present invention to the loss of flexibility preventing uniform contact between the windshield wiper and the curved windshield. As found in U.S. Pat. Nos. 2,656,448 to Lentz; 2,746,077 to Higgins; 3,408,678 to Linker; 3,530,525 to Abel; 3,574,881 to Temple; 3,619,556 to Deibel; 3,667,083 to Linker; 4,325,160 to Burgess; 4,360,941 to Mabie; and 4,670,933 to Toplenszky it is well known in the art to embed or bring into intimate contact a heating element with a flexible wiper element of a windshield wiper assembly designed to operate on curved windshield of an automobile. In U.S. Pat. No. 2,903,732 there is disclosed a wiper blade construction for de-icing a windshield by forming a gap between two wiper blades so that the gap between the blades forms a passageway for hot air generated by a heating element situated within an insulator sleeve provided within a cylindrical wiper body. In the operation of the wiper, the heating element prevents ice from forming on the windshield and the reduction of visibility thereby.

While it is known in the art to provide an electrical heater in a windshield wiper blade, the blade construction is such that the heater is always placed at a site for the purpose of heating the squeegee element of the blade. The purpose to be served by the heater placement according to the prior art is that of keeping the squeegee element free of ice and snow, however, according to the present invention such measures are ineffective to prevent the accumulation of ice and snow on the main pressure frame as well as the secondary pressure frames whereby the functioning by these frames is diminished impairing the efficient wiping contact between the squeegee and the windshield. Since ice and snow is allowed to accumulate on the pressure frames, there is a likelihood that the accumulations will approach the squeegee. This necessitates that the heating element being in continuous use in the inclement weather to maintain the squeegee free of ice and snow accumulations. The life expectancy of the elastomer material forming the squeegee is shortened due to thermal degradation. A need therefore is seen to exist for a wiper blade construction which will avoid the need to heat the squeegee element and at the same time improve the resistance to accumulations of ice and snow on the wiper.

Accordingly, it is an object of the present invention to provide an improved wiper for windshields and back windshield of an automobile having an electrically resistive heater mounted on pressure frames of the wiper blade and maintain in a protective environment provided by a shroud of which the squeegee element is wholly external thereof.

It is a further object of the present invention to provide an improved construction for a wiper for a windshield of a back windshield of an automobile which will allow modification existing wipers without modification and replacement of existing parts.

SUMMARY OF THE PRESENT INVENTION

More particularly, according to the present invention there is provided a heated windshield wiper supported by a wiper arm for use in a vehicle having a curved glass surface, the heated windshield wiper including the combination of an elongated squeegee having a bead portion generally coextensive on one side with a flexible wiping edge on a side opposite thereto, a primary pressure frame including means for support by the wiper arm, secondary pressure frames pivotally supported by the primary pressure frame for conforming to the curved glass surface; a mounting strip engagable with the squeegee while supported by the secondary pressure frames for allowing flexing of the squeegee relative to the primary pressure frame, an elongated electrically powered heater means supported by the secondary pressure frames remote to the bead of the squeegee; and a shroud of resilient flexible material enveloping the primary pressure frame and the secondary pressure frame and extending substantially coextensive with the extended length of the elongated electrically powered heater means, the shroud maintaining an environment enclosed thereby at a temperature which is elevated above ambient temperature in response to operation of the electrically powered heater means to prevent adherence of ice and snow.

BRIEF DESCRIPTION OF THE PREFERRED EMBODIMENTS

DETAILED DESCRIPTION OF THE PREFERRED EMBODIMENT

Figure 1:
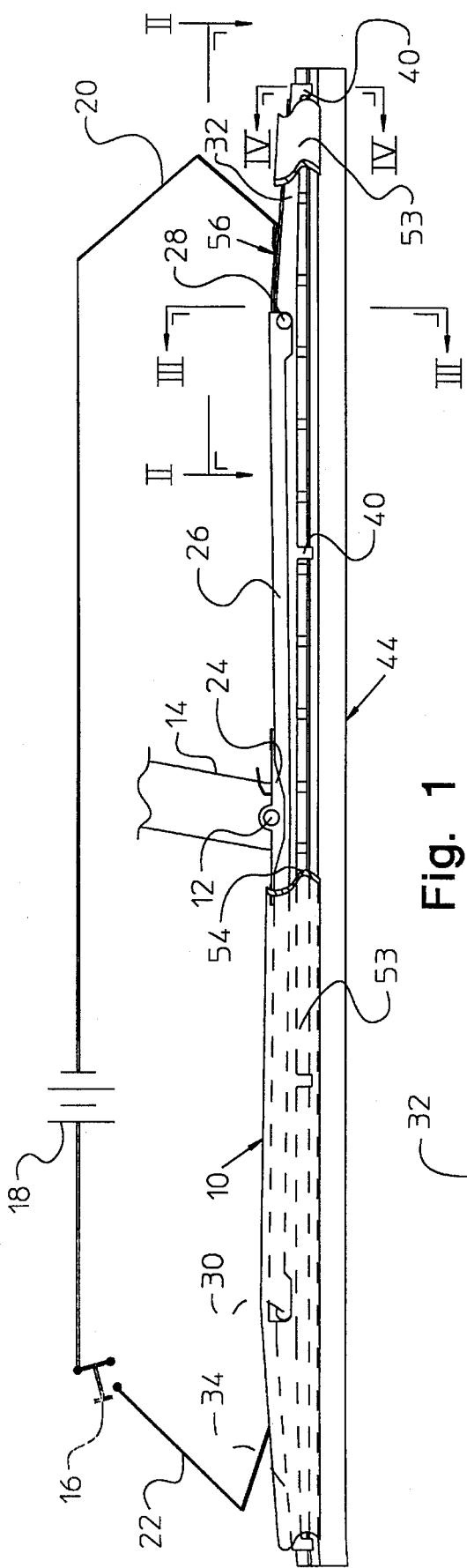
FIG. 1 is an elevational view partly in section of a preferred embodiment of a heated windshield wiper according to the present invention.

As shown in FIGS. 1–4, according to the preferred embodiment of the present invention, there is provided a heated windshield wiper 10 which is engaged by a pivot shaft 12 on the extended end of a wiper arm 14 arranged to reciprocate back and forth along a curved glass surface of a windshield or a back windshield of an automobile. Schematically shown in FIG. 1 is an electrical circuit that includes a switch 16 which can be moved to a current conducting position by an operator to apply electrical potential of the car's battery 18 to electrical leads 20 and 22 which extend along the wiper arm 14 to an electrical heater forming part of the wiper 10 as will be described in greater detail hereinafter. The pivot 12 is engaged with a tubular portion of a mounting structure 24 centrally disposed along the extended length of a primary pressure frame 26 having at its opposite ends pivots 28 and 30. The pivots 28 and 30 pivotally engage the central portion of secondary pressure frames 32 and 34, respectively.

Figure 4:
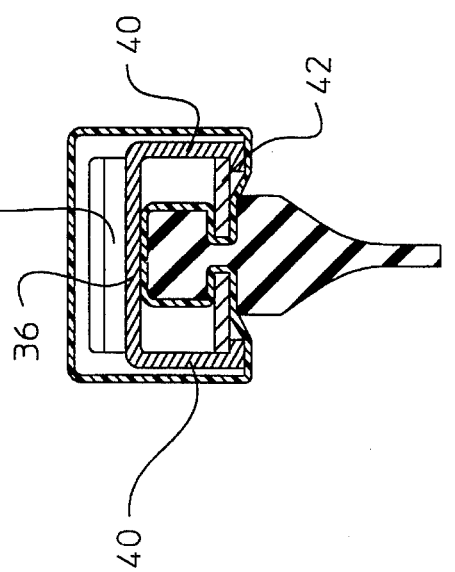
FIG. 4 is a sectional view taken along lines IV—IV of FIG. 1.
Figure 3:
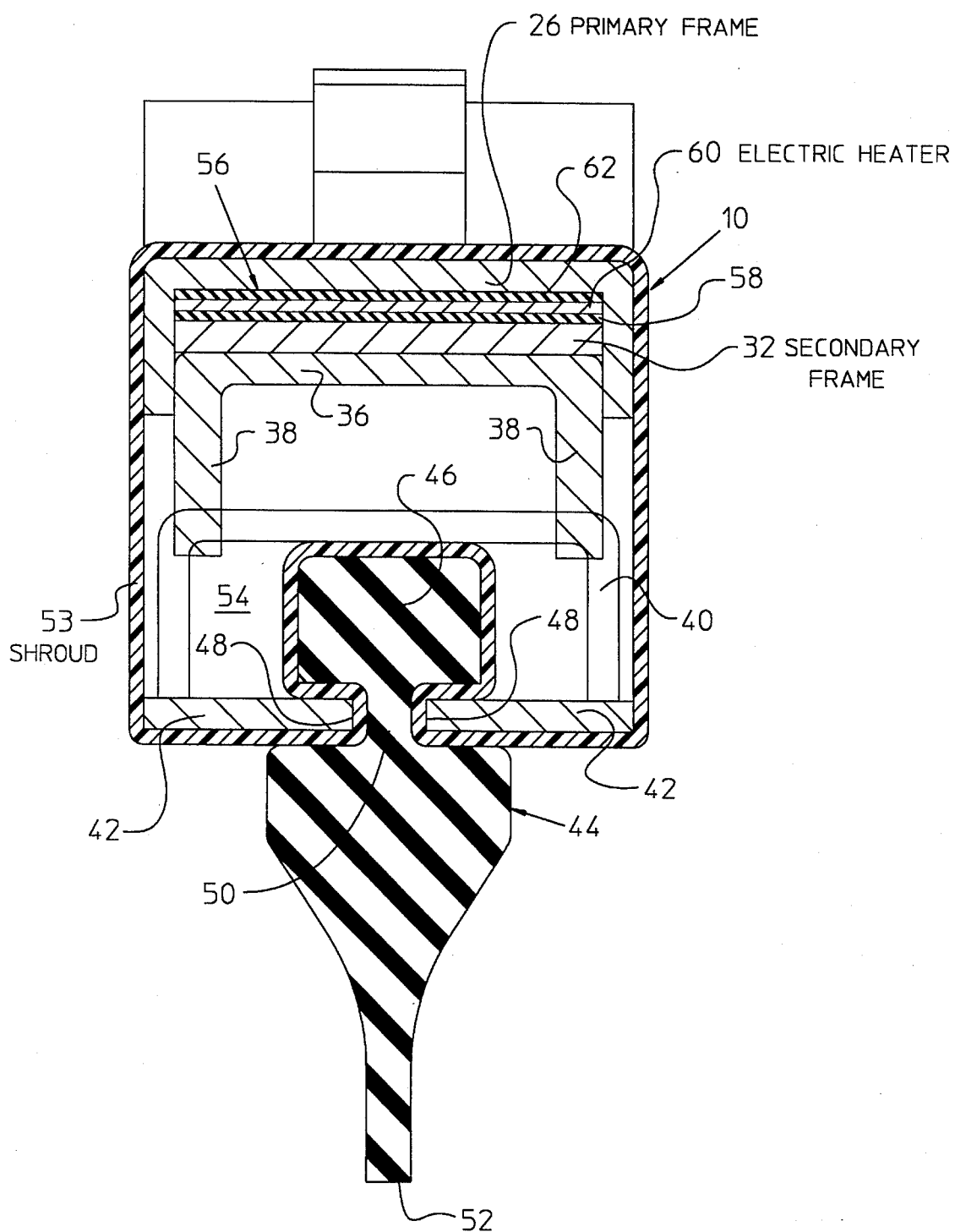
FIG. 3 is a sectional view taken along lines III—III of FIG. 1.

As best shown in FIG. 3, each of the secondary pressure frames have a U-shaped cross-section which forms a broad faced mid-section 36 joined with oppositely locating depending leg sections 38. As best shown in FIG. 4, at each end of each secondary pressure frame there are pairs fingers sections 40 having legs which project toward each other and engage opposite sides of a metal strip 42 serving to releasably hold a squeegee 44. Strip 42 is made up of two parallel legs held in a spaced apart relation by a cross head 43, per se well known in the art. The squeegee is formed with a bead portion 46 extending co-extensively with the length of the squeegee and separated by oppositely directed longitudinal recesses 48 that form a transition section 50 which extends to a flexible wiping edge 52. According to a feature of the present invention, a shroud 53 comprised of resilient flexible material, preferably a synthetic resin such as nylon, has an elongated tubular shape with open ends that allow the shroud to be slipped over the primary and secondary pressure frames substantially coextensive with their extensive length. The shroud is depicted in FIG. 1 and broken away as to the right hand portion of the wiper to enable illustration of the primary and secondary pressure frames. The peripheral size of the shroud in cross-section is such as to allow a wrapping of the shroud about the bead portion and extending through reversely bent portions situated in each of the longitudinal recesses 48 wherein the shroud is held by the subsequent placement of metal strip 42. The opposite longitudinal edges of the metal strip are engaged with each of the finger sections 40 to maintain the desired flexibility of the wiper for conforming to the curved glass surface of the windshield.

Figure 2:
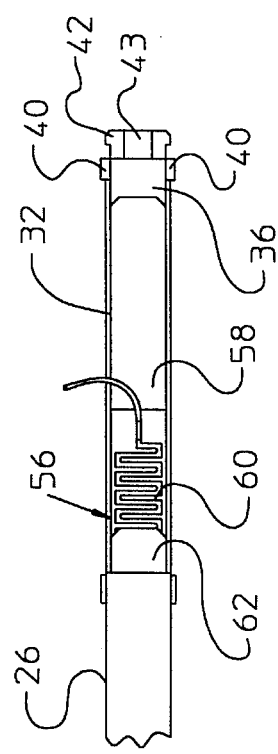
FIG. 2 is a partial plane view taken along lines II—II of FIG. 1.

The space enveloped by the shroud forms an electrically heated chamber 54 provided by arranging electrically heating assemblies 56 along the broad faced mid-sections of each of the secondary pressure frames. Each heating assembly is made up of a layer of electrical insulation 58 applied directly to section 36 of the frame onto which there is applied a heating coil 60 made up of reversely bent portions that extend to and fro across the width of the secondary pressure frame in a serpentine-like fashion, as shown in FIG. 2. Overlying the heating coil 60 is a protective layer of electrical insulation 62.

It is to be understood that in the preferred embodiment shown in FIG. 1, the primary pressure frame is extended as to the length of the windshield wiper by the secondary pressure frames. However, the present invention is equally applicable to other well known wiper constructions in which secondary pressure frames are utilized and present a suitable mounting surface upon which an electrically powered heater can be supported and used to maintain a heated chamber within a shroud that is placed on the wiper.

The present invention eliminates the difficulty of changing the squeegee part of a wiper blade that is specially constructed to incorporate a heater element. Moreover, the present invention avoids the need to utilize a squeegee made of special, expensive material to resist the heat produced by an electrical-resistance heating means imbedded therein or in contact therewith so as to heat the squeegee. Applicant solves these problems by providing a flexible wiper of the kind which has a shrouding means of particular shape such that it defines an interior space which contains a resistance heating means and has edges which fold about wiper-retaining means to form a slot, into and out of which a wiper member may be, respectively, inserted and extracted, without making or breaking any electrical connections. Some radiant heating of the squeegee beneficially occurs due to the residence of bead portion 46 in the heated chamber 54 to maintain the pliable elastic properties desired of the squeegee to preform its wiping operation as intended. In cold climates when a wiper blade is to operate at about freezing temperatures particularly sub freezing temperatures the resilience of the elastic material making up the squeegee degrades whereby the squeegee becomes stiff thus loosing effectiveness for wiping away melted ice and snow from the windshield.

While the present invention has been described in connection with the preferred embodiments of the various figures, it is to be understood that other similar embodiments may be used or modifications and additions may be made to the described embodiment for performing the same function of the present invention without deviating therefrom. Therefore, the present invention should not be limited to any single embodiment, but rather construed in breadth and scope in accordance with the recitation of the appended claims.

I claim:

1. A heated windshield wiper supported by a wiper arm for use in a vehicle having a curved glass surface, said heated windshield wiper including the combination of:

an elongated squeegee having a bead portion generally coextensive on one side with a flexible wiping edge on a side opposite thereto;

a primary pressure frame including means for support by said wiper arm;

secondary pressure frames pivotally supported by said primary pressure frame for conforming to said curved glass surface;

a mounting strip engagable with said squeegee while supported by said secondary pressure frames for allowing flexing of the squeegee relative to said primary pressure frame;

an elongated electrically powered heater means adhered to and supported by said secondary pressure frames remotely from said bead of the squeegee; and a shroud of resilient flexible material enveloping said primary pressure frame and said secondary pressure frames and extending substantially coextensive with the extended length of said elongated electrically powered heater means, said shroud maintaining an environment containing said primary and secondary pressure frames enclosed thereby at a temperature which is elevated above ambient temperature in response to operation of said electrically powered heater means to prevent adherence of ice and snow.

2. The heated windshield wiper of claim 1 wherein said shroud of resilient flexible material has a tubular configuration with open ends.

3. The heated windshield wiper according to claim 2 wherein said tubular configuration of said shroud wraps about said bead portion of said squeegee for support by said mounting strip.

4. The heated windshield wiper according to claim 2 wherein said squeegee is further defined by longitudinal slots opening outwardly and separating at opposite sides of said squeegee thereby separating said bead portion from said flexible wiping edge at said opposite sides of said squeegee and wherein the tubular configuration of said shroud is folded inwardly about said bead portion and folded outwardly from said slots for wrapping about said primary and secondary pressure frames.

5. The heated windshield wiper according to claim 4 wherein said heating coil has a reversely bent portions forming a serpentine configuration to maximize the length of heating coil supported by each of said secondary pressure frames.

6. The heated windshield wiper according to claim 1 wherein said elongated electrically powered heater means comprises an outer and inner layer of insulation extending along opposite sides of an electrically powered heating coil.

* * * * *